Dec. 21, 1965 H. A. McMASTER 3,224,856
GLASS ACTUATED CONTROL FOR THE CONVEYOR
MECHANISM OF A GLASS BENDING FURNACE
Filed Nov. 27, 1964 5 Sheets-Sheet 1

INVENTOR.
HAROLD. A. McMASTER
BY
Owen + Owen
ATTORNEYS

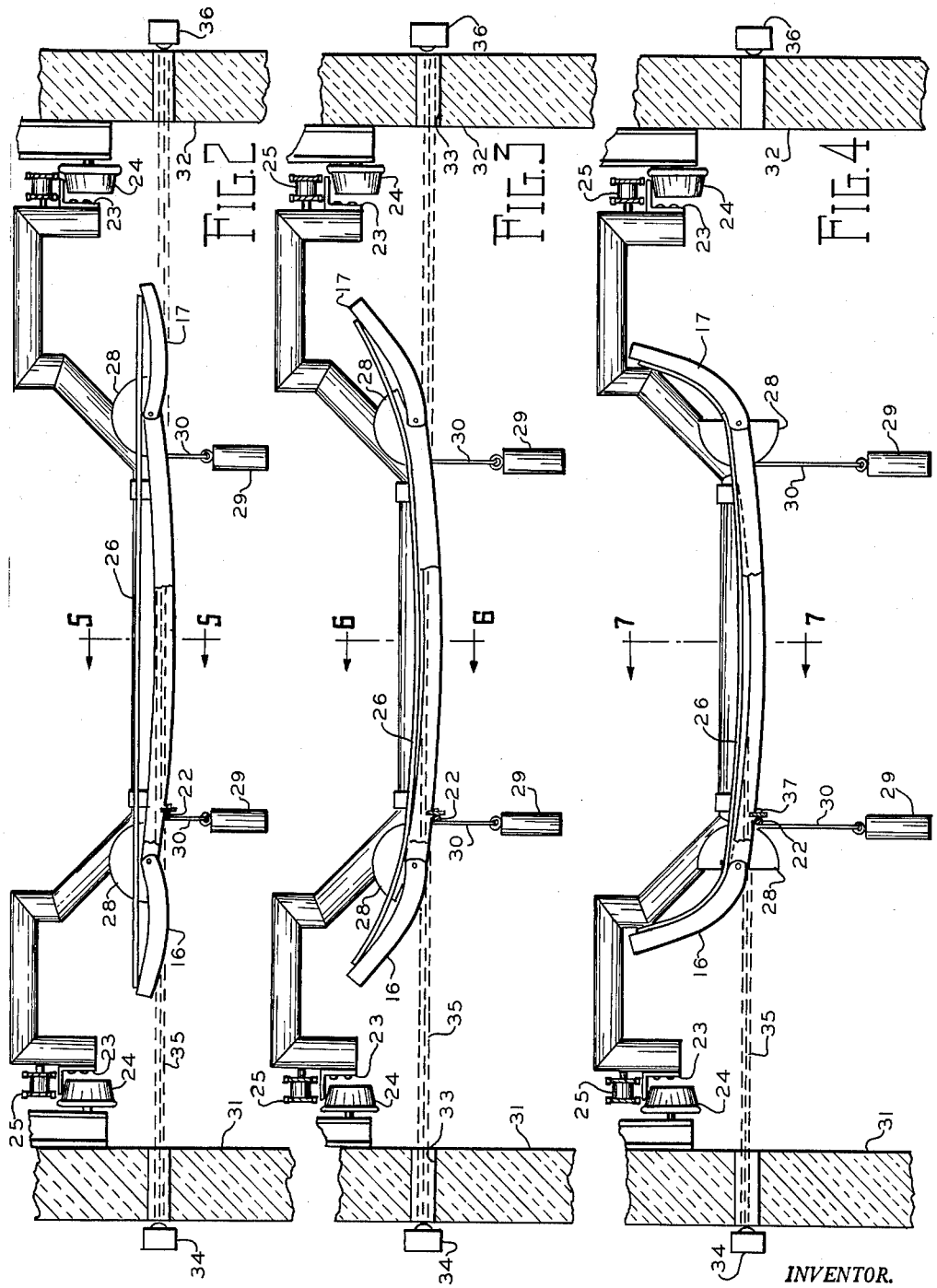

Dec. 21, 1965 H. A. McMASTER 3,224,856
GLASS ACTUATED CONTROL FOR THE CONVEYOR
MECHANISM OF A GLASS BENDING FURNACE
Filed Nov. 27, 1964 5 Sheets-Sheet 3

INVENTOR.
HAROLD. A. McMASTER
BY Owen & Owen
ATTORNEYS

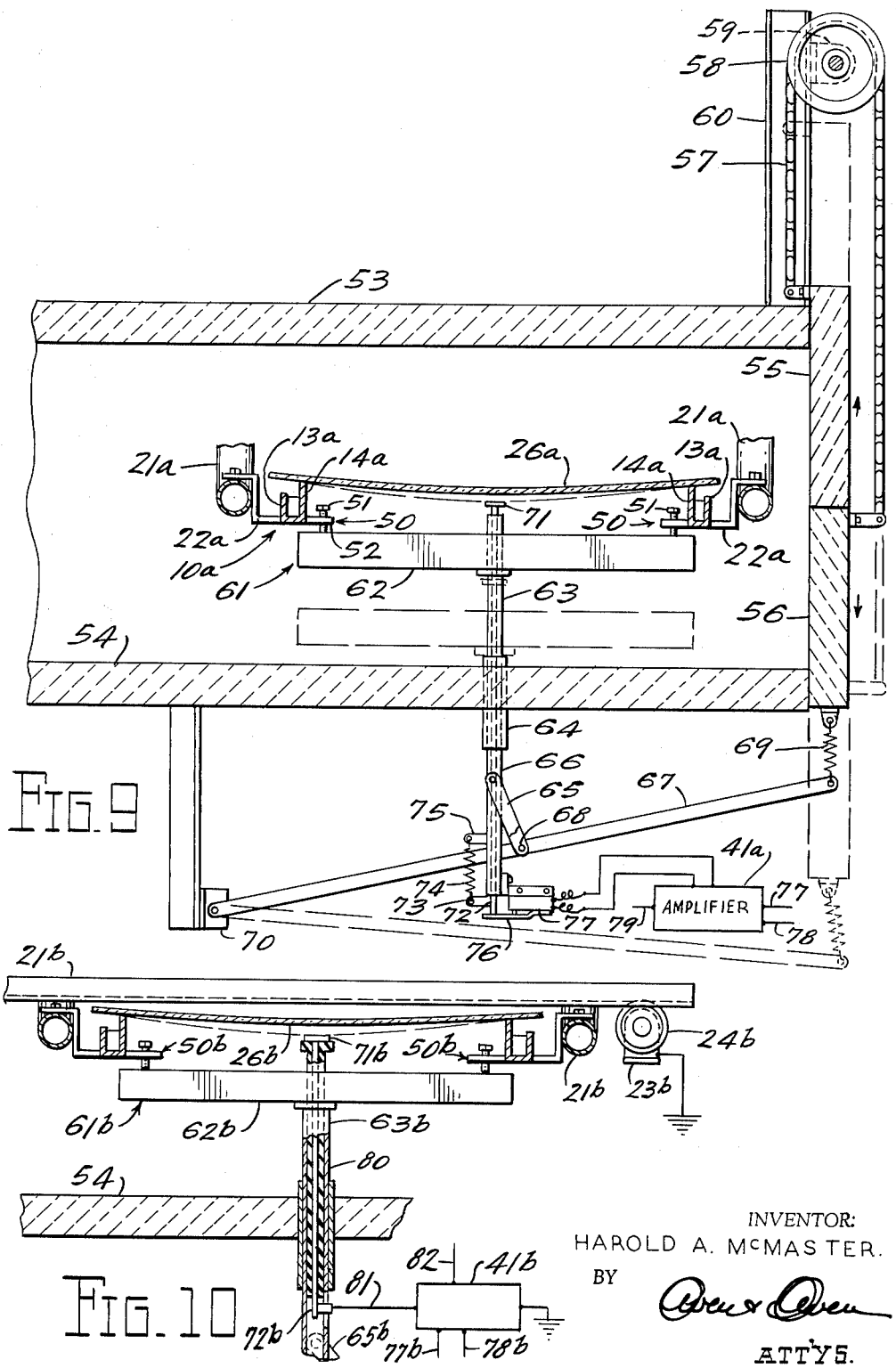

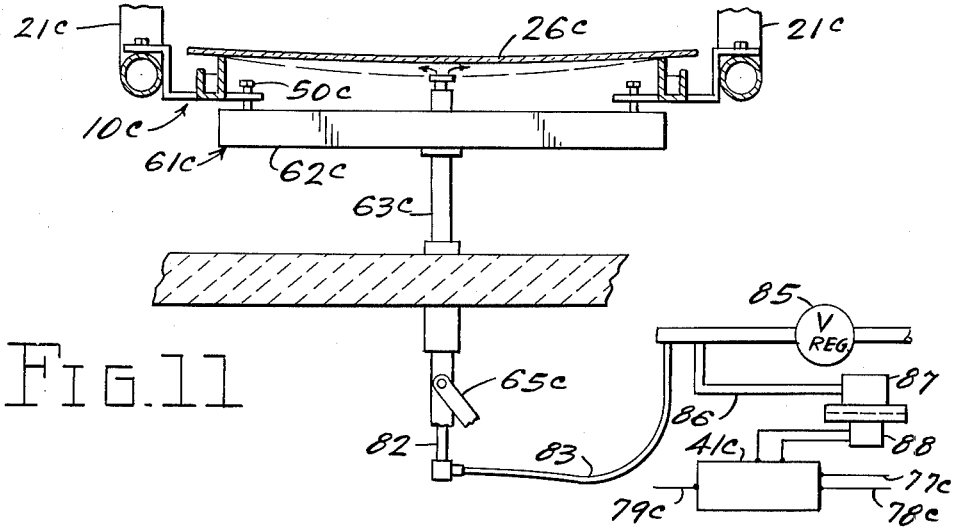
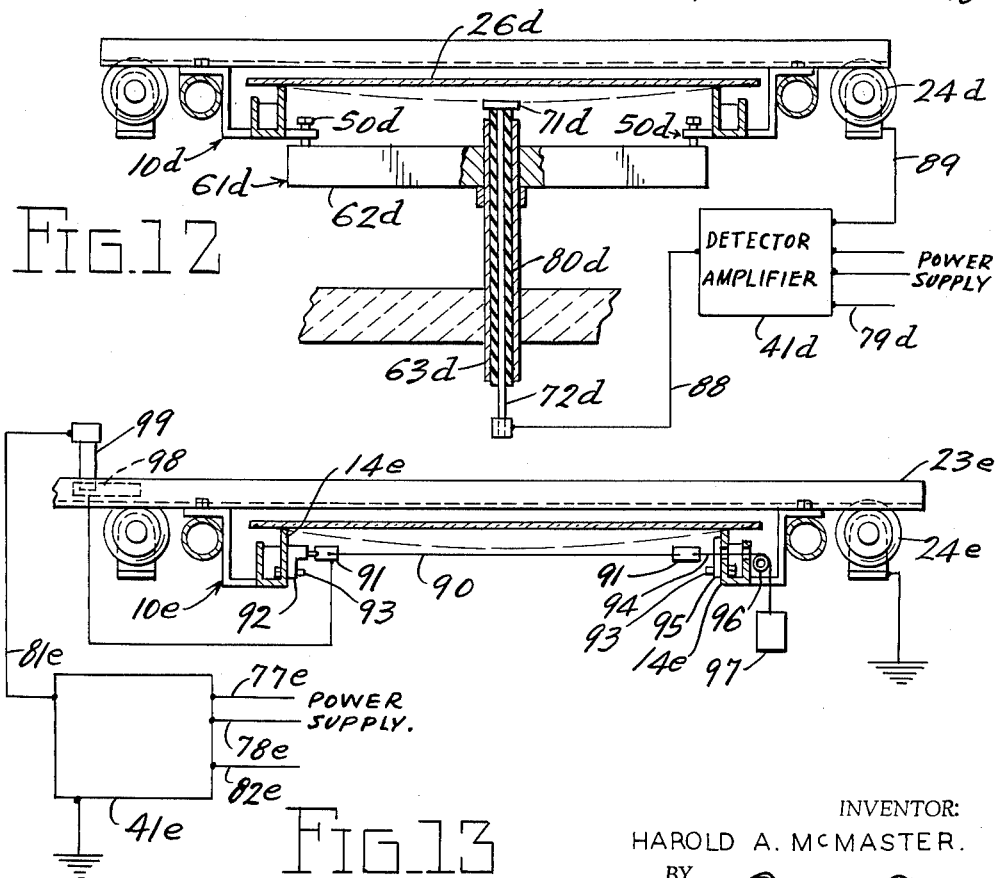

United States Patent Office 3,224,856
Patented Dec. 21, 1965

3,224,856
GLASS ACTUATED CONTROL FOR THE CONVEYOR MECHANISM OF A GLASS BENDING FURNACE
Harold A. McMaster, 707 Riverside Drive, Woodville, Ohio
Filed Nov. 27, 1964, Ser. No. 414,294
6 Claims. (Cl. 65—163)

This application is a continuation-in-part of my co-pending application Serial Number 21,225 filed April 11, 1960, now abandoned.

This invention relates to control of the degree of bend of glass positioned in glass bending molds, which control is actuated by the bending of the glass itself, i.e., by the degree to which the glass is bent rather than by such mechanisms as independent timers, etc.

While the invention has utility in controlling the degree of bending of any tye of glass sheets of which many are to be formed, it will be illustrated as incorporated in a method and apparatus for controlling a furnace for the formation of large bent sheets of glass, such as the back-lights and windshields of motor vehicles.

Back-lights and windshields of motor vehicles are frequently contoured in three dimensions, usually having center portions which are curved both transversely of the vehicle and from the bottom to the top of the windshields or back-lights. The ends of a windshield or back-light are more sharply curved to "wrap around" the front or rear corners of the vehicle body. Back-lights and windshields of this general type usually are fabricated from flat sheets of plate or other glass, which are bent to the desired shape by being placed upon skeleton molds or contoured members which engage the peripheral edges of the sheets of glass and then being moved into a furnace which heats the glass to a temperature such that force including gravity applied to the glass bends it to the desired configuration.

It has been discovered that the molds for bending sheets of glass into such shape should be strong enough to support the glass and to exert force upon it, but skeletal in nature so as to absorb and store as little heat as possible and so as to warp and twist due to changes in temperature as little as possible. While various means have been devised for inhibiting and controlling the change in shape of such a mold under extreme changes in temperature, it is almost impossible to so design and build a number of molds which will all have the same shape at the furnace temperature.

Because successive molds may not have the same shape at furnace temperature, any glass shape sensing means which depends upon the position of any part of the glass being bent relative to a stationary portion of the furnace is not successful in producing identically bent sheets of glass. One sheet of glass may be bent to a position relative to the furnace which is identical to the position to which the preceding sheet of glass was bent and yet the shapes of the two sheets of glass may not be identical because of differences in the degree of change of shape of the two separate molds upon which the two pieces of glass were bent or molded.

Most furnaces of this type operate on time-controlled cycles so that whether the furnace has one, two, three, or more, heating stages, each successive piece of glass and its shaping mold are held in each heating stage for a certain period of time empirically arrived at as being the time necessary for the glass to be softened and to be bent to the desired final shape. Unfortunately, successive pieces of glass do not always respond identically to identical time cycles and, therefore, some may be bent too little and some bent too much.

It is the principal object of this invention to provide a method and an apparatus for controlling the conveyor mechanism of a bending furnace which both moves the glass sheets in their respective molds into and out of the final heating zone, the control being responsive to the position of the glass itself relative to the particular mold upon which it is being shaped.

It is another object of the instant invention to provide a method and apparatus for the control of the duration of dwell of a piece of glass being bent under heat according to the response of that glass to the heat and to the forces acting upon it relative to the mold upon which it is being formed.

It is yet another object of the instant invention to provide a method and apparatus for controlling the duration of dwell of a piece of glass being bent in the final heating zone of a furnace in response to the change in shape of the glass itself relative to the mold upon which it is being formed, and in which the entire control mechanism, with the exception of a single member, is mounted independently of the mold upon which the glass is being bent—that single member being so mounted as to provide for adjustment and compensation for the characteristics of the particular mold under extreme changes in temperature.

These and other more specific objects and advantages of the apparatus and method embodying the invention will be better understood from the specification which follows and from the drawings, in which:

FIG. 2 is a fragmentary view partly in section and partly in elevation, taken substantially from the position indicated by the line 2—2 of FIG. 1, and showing a glass sheet in planar configuration prior to bending, with portions of the furnace utilized for heating the glass;

FIG. 3 is a view similar to FIG. 2 but of the mold and the glass sheets in an intermediate position between its planar configuration and its final bent configuration;

FIG. 4 is a view similar to FIGS. 2 and 3, but showing the mold and the glass sheet in final form just prior to removal from the furnace;

Figure 5:
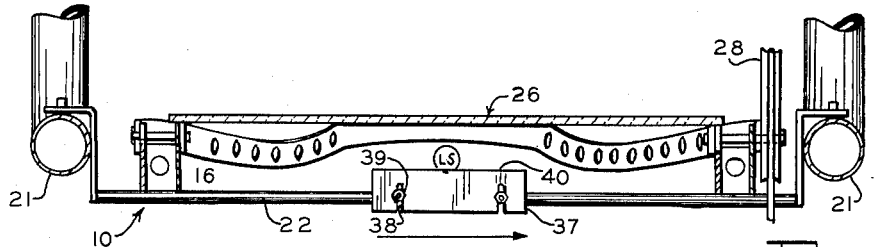
Figure 6:
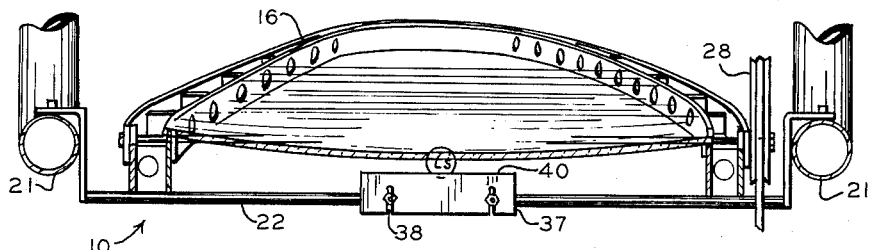
Figure 7:
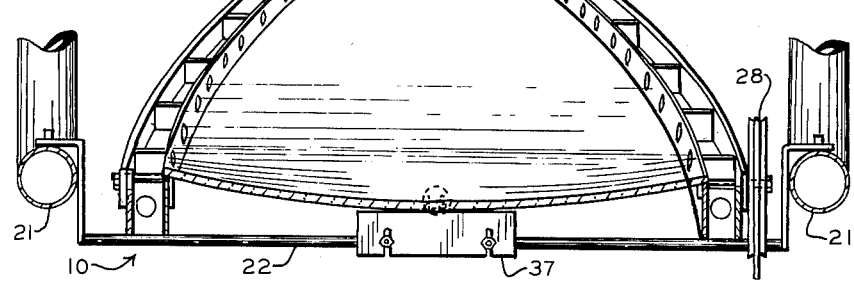
Figure 8:
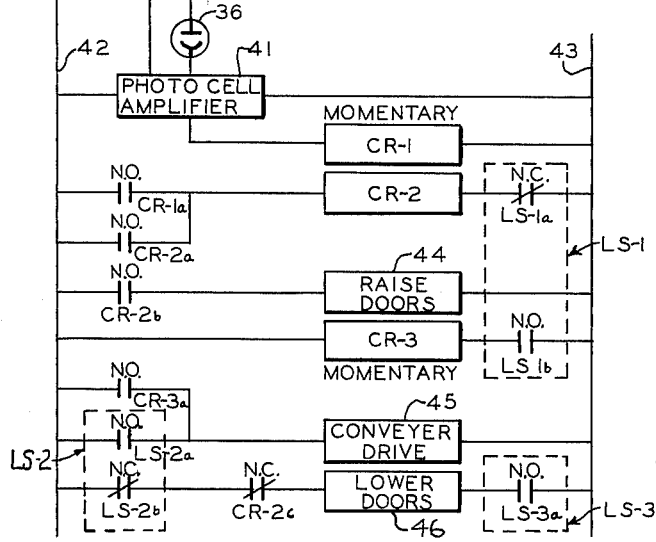

FIGS. 5, 6 and 7 are fragmentary vertical sectional views taken along the line 5—5, 6—6 and 7—7 of FIGS. 2, 3 and 4, respectively;

FIG. 8 is a simplified wiring diagram of exemplary electrical apparatus of a control embodying the invention and which functions according to the method of the invention;

FIG. 9 is a fragmentary, sectional view taken longitudinally through a glass bending furnace at approximately the same plane as is FIGURE 5, and showing another embodiment of the invention, wherein the sagged position of the glass on the stationary mold in the furnace is sensed by a mechanical finger which actuates electrical switch means;

FIG. 10 is a fragmentary, sectional view similar to FIGURE 9 but showing still another embodiment of the invention, wherein the glass is made one terminal of an electrical circuit which is closed when the sagged portion of the glass engages a sensing contact;

FIG. 11 is a fragmentary, sectional view similar to FIG. 10 but showing another embodiment of the invention wherein the sagged position of the glass is sensed by the throttling of an air jet;

FIG. 12 is a fragmentary, sectional view similar to FIG. 10 showing another embodiment of the invention wherein the glass is caused to be one plate of a condenser whose sagged position is sensed by a plate forming the other portion of the condenser; and FIG. 13 is still another embodiment of the invention wherein separate electrical means are carried by each mold to sense the sagged position of the glass.

Figure 1:
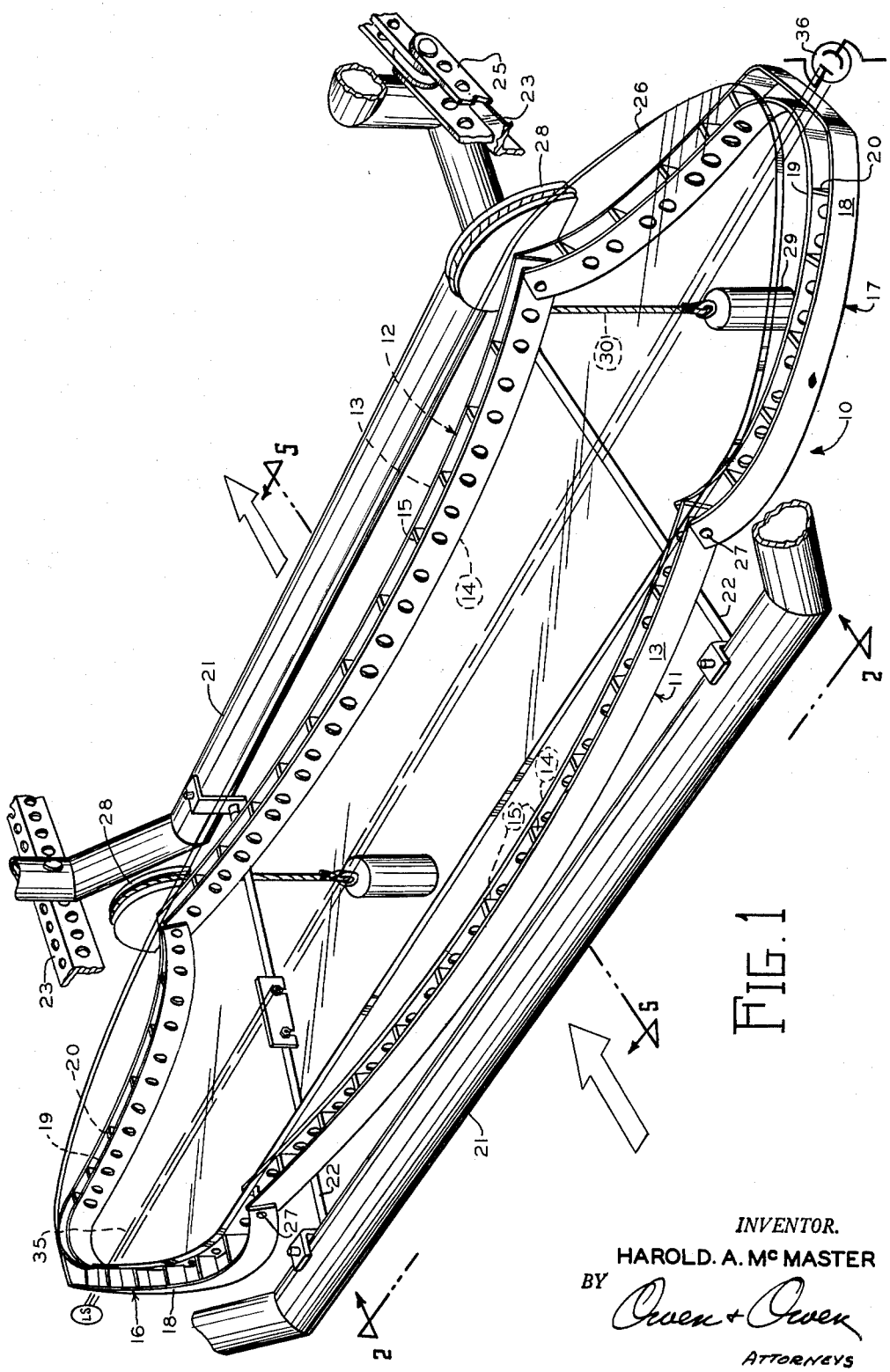
FIG. 1 is a fragmentary view in perspective of a skeleton mold for carrying and forming flat sheets of glass into "wrap around" vehicle windows such as back-lights and windshields, the mold being equipped with a control member constituting a part of a mechanism embodying the invention and operating according to the method of the invention.

As illustrative of glass bending molds with which the method and apparatus of the invention may advantageously be employed, there is shown in FIG. 1 a skeletal backlight or windshield mold generally indicated at 10. The mold 10 comprises a pair of side channels 11 and 12 each of which is illustrated as consisting of two parallel curved bars 13 and 14 having glass supporting surfaces of predetermined configuration and rigidly connected by a plurality of cross braces 15. The side channels are contoured according to the finished shape of the central portions of the upper and lower edges of the back-light or windshield being formed.

The mold 10 for the purpose of forming such a glass element also has a pair of hinged wings 16 and 17 each of which is generally U-shaped and fabricated from a pair of bent bars 18 and 19 again connected by cross braces 20. Each of the wings 16 and 17 is pivotally connected at the ends of its bars 18 and 19 to the two side channels 11 and 12.

The channels 11 and 12 and wings 16 and 17 are contoured and of such plan configuration as to outline the shape of the edges of the finished, double curved backlight or windshield according to the design of the particular vehicle into which the finished bent piece of glass is to be installed. While the primary importance in shape lies in the peripheral edge of such a bent or molded sheet of glass, since it must fit closely into the opening formed in the steel body of the vehicle, the shape of the generally central areas of such a sheet of glass also is of importance. For example, if the glass sags to too great an extent in the open area between side channels 11 and 12 and wings 16 and 17, i.e., if the glass is heated to too high a temperature or held in a high temperature zone for too long a period, the overall contour of the piece of glass will be spoiled. In addition, gravity acting upon the over-softened piece of glass may cause the weight of its central portion to pull its peripheral edges inwardly away from the respective side channels 11 and 12 or wings 16 and 17 and the finished piece of glass may no longer fit the opening in the vehicle into which it is to be installed. Conversely, if the glass is held in place in the final heating zone for too short a period of time and it is thus bent to too slight a degree, the reverse situation may prevail and the piece again may be a "reject."

The skeletal mold 10 comprising the side channels 11 and 12 and wings 16 and 17 is carried by a mold frame. In the structure illustrated in the drawings, the mold frame or support consists of a pair of heavy girders 21 illustrated as being fabricated from lengths of tubing welded together. The girders 21 are spaced from each other by struts 22 extending between the girders 21 and by horizontal rails 23. The struts 22 support the side channels 11 and 12 of the mold 10. The rails 23 serve not only to rigidly connect upright ends of the girders 21, but, in the structure illustrated, they also serve as riders to allow each mold 10 to roll through the furnace on a plurality of rollers 24 (see FIGS. 2 and 4) rotatably mounted within the furnace by suitable structural elements.

A furnace designed for the purpose of serially treating a large number of pieces of the glass to form contoured back-lights or windshields usually is equipped with a plurality of individual glass molds such as the mold 10, and for purposes of illustration the glass molds 10 are shown as being connected to a chain link conveyor fragmentarily shown at 25. In the structure shown in the drawings, the conveyor chain 25 would be pivotally connected to each of the girders 21 of each mold 10 and similarly to other girders 21 of other molds 10 with which the furnace is equipped. The conveyor 25 is engaged with suitable driving means (not shown), for example, a large sprocket or other mechanism by which force may be applied to the conveyor chain 25 for pulling the molds 10 along on the support rollers 24.

In a furnace of the type generally referred to, each of the molds 10 is moved to a position adjacent the entrance end of the furnace where an operator places a flat glass sheet 26 in place on the respective mold 10. At this time, i.e., before the mold enters the furnace, its wings 16 and 17 are held in their down position as illustrated in FIGS. 1 and 2, so that the flat glass sheet 26 can be rested upon the mold 10 and particularly on the ends of the bars 14 of the side channels 11 and 12. Upon the start of a cycle, the entrance doors of the furnace are opened and the conveyor drive mechanism energized to move the series of molds, including the mold 10 just loaded, one station forward. This moves the just loaded mold 10 into the furnace to either the first position of a multi-stage furnace or, if a single stage furnace, merely into the heated, controlled temperature zone.

Each of the molds 10 is illustrated as being provided with force applying means for urging its wings 16 and 17 upwardly on their pivot points where they are connected to the side channels 11 and 12, in the structure shown the pivot points consisting merely of pins 27 extending through the ends of the curved bars 13, 14 and the wing-forming bars 18 and 19. The force applying means in the molds illustrated in the drawings consist of two sectors 28 which are welded or otherwise attached to the respective wings 16 and 17 and are rotated on the pins 27. Weights 29 of suitable mass are suspended by cables 30 which are stretched over the surfaces of the sectors 28 to apply force to the sectors 28 and to the wings 16 and 17, tending to swing them upwardly. When the mold 10 is outside the furnace and the flat glass sheet 26 lies thereon, the stiffness of the glass sheet 26 resists the upward swinging movement of the wings 16 and 17. However, after the mold 10 has been moved into the furnace as described above, and after a period of time such that the glass sheet 26 begins to soften, the force exerted by the weights 29 on the sectors 28 begins to bend the glass sheet 26 by swinging the wings 16 and 17 upwardly. This bending action continues until the wings 16 and 17 are swung upwardly to the ultimate distance of travel, and the glass sheet 26 in its central portion sags sufficiently so that its peripheral edges rest upon the upper surfaces of the inner bars 14 of the side channels 11 and 12.

The method and apparatus of the invention is designed for the purpose of sensing the degree of bending of the glass sheet 26 and actuating the mechanism driving the conveyor chain 25 to remove the particular mold 10 and its bent glass sheet 26 from the furnace when the sheet has been bent to the desired degree.

Referring now to FIGS. 2 and 5, 3 and 6, and 4 and 7, respectively, these three sets of figures illustrate the glass sheet 26 in its original planar condition (FIGS. 2 and 5) in an intermediate partially bent condition (FIGS. 3 and 6) and in a final contoured and fully bent position (FIGS. 4 and 7).

According to the invention, the furnace walls generally indicated at 31 and 32 are provided with aligned openings 33 at the final heating zone—whether it be the single heating zone of the furnace or the last heating zone in a multiple stage furnace. The openings 33 are aligned both vertically and horizontally, and their level is selected so that a light source 34 may be placed in one opening 33, for example, in the furnace wall 31, to throw a beam of light, generally indicated at 35, across the furnace and beneath the sheet of glass 26 which is in the final heating zone. A photo-electric cell 36 is similarly positioned at the opening 33 in the other furnace wall, for example, the wall 32.

The vertical level of the beam of light 35 emanating from the light source 34 and striking the photo cell 36, is such that it is not interrupted by the glass sheet 26 or by any structural element of the mold 10 which has so far been described, and the beam of light 35 may, therefore, generally be said to extend across the furnace beneath the glass sheet. The vertical level of the beam of light 35 is selected, however, so that it can be and will be interrupted in part by the lower surface of the glass sheet 26 when it reaches its ultimate desired contour. Its vertical thickness is sufficient to accommodate variation due to warp or twist of the mold in the position of means carried by the mold which also partially interrupt the beam to establish a reference plane for that mold to which the glass sheet is bent.

In the mold illustrated in the drawings, the reference means for establishing the reference plane consists of a plate 37 adjustably carried, for example, by one of the struts 22. The plate 37 has vertical slots 38 through which there may extend a pair of clamping bolts 39 which are threaded into the strut 22. By loosening the bolts 39, the vertical position of the straight top edge 40 of the plate 37 may be adjusted relative to the strut 22 and thus relative to the particular mold 10 under consideration. The height of the plate 37 is so selected that its upper edge 40 partially cuts off the beam of light 35, establishing thereby a reference plane relative to the particular mold 10 under discussion rather than to the furnace proper or to the light source 34 or photo cell 36.

Apparatus embodying the invention thus provides means whereby the reference plane to which a molded glass sheet is to be bent is determined by the particular mold upon which that sheet is being bent. The position of the particular plate 37, establishing the reference plane for that particular mold 10, may be accurately determined in accordance with the change in shape of the particular mold under the extreme change in temperature it undergoes and at the temperature which it reaches in the final heating zone of the furnace.

As can best be seen by reference, respectively, to the pairs of FIGURES 2, 5, 3, 6 and 4, 7, as the wings 16 and 17 swing upwardly and the central portion of the sheet of glass 26 sags under the influence of the forces applied thereto, including gravity, the bottom surface of the sheet of glass 26 gradually begins to interrupt the light beam 35 (FIGS. 3 and 6) and finally sags into the reference plane established by the upper edge 40 of the plate 37, cutting off the light beam 35 completely (FIGS. 4 and 7).

FIGURE 8 is a simplified wiring diagram illustrating how control apparatus embodying the invention and the method of the invention provide for the control of the conveyor mechanism of the glass bending furnace as well as its entrance and exit doors in response to the bending of each sheet of glass. The photo-electric cell 36 is connected to a suitable photo cell amplifier 41 conventionally connected between power lines 42 and 43. A momentary relay CR–1 is actuated from the photo cell amplifier 41 when light to the photo-electric cell 36 is cut off as illustrated in FIGS. 4 and 7. Relay CR–1 closes momentarily, closing its normally open contact CR–1–A and energizing relay CR–2. Relay CR–2 closes its "lock-in" contacts CR–2–A and closes its normally open contact CR–2–B to feed current through a door raising motor or other mechanism generally indicated at 44. The door raising mechanism 44 operates to raise both the entrance and exit doors of the furnace (not shown). When the entrance and exit doors reach their fully open position, dogs carried by at least one of the doors actuates limit switch LS–1. Actuation of limit switch LS–1 opens its normally closed contacts LS–1–A, dropping relay CR–2 out of circuit. This opens the power line to the door raising mechanism 44, de-energizing this mechanism and leaving the doors in fully open position. Actuation of limit switch LS–1 also closes its normally open contacts LS–1–B establishing a circuit through a momentary hold relay CR–3. Relay CR–3 closes its normally open contact CR–3–A establishing a circuit through conveyor drive mechanism generally indicated at 45 in FIG. 8, but not shown in the drawings, to move the conveyor chain 25, pulling the just loaded one of the molds 10 into the entrance end of the furnace and moving that one of the molds 10 whose sheet of glass 26 cuts off the light beam 35 out of the furnace.

The conveyor chain 25 carries a series of limit switch actuating dogs spaced from each other along the length of the chain 25 the distance which it is desired to move each one of the molds 10 during each cycle. Each of the dogs carried by the conveyor chain 25 actuates a limit switch LS–2 upon reaching the end of the distance of the desired movement. Limit switch LS–2 has a pair of normally open contacts LS–2–A which are parallel to the normally open contacts CR–3–A of the momentary relay CR–3. As soon as the conveyor drive mechanism 45 starts to drive the conveyor chain 25, the particular one of the dogs on the chain 25 moves off of limit switch LS–2 allowing the normally open contacts LS–2–A to close and establishing a path for current to the conveyor drive 45 which is parallel to the path established by the contacts CR–3–A of the momentary relay CR–3. The relay CR–3 thus needs to stay in circuit only long enough for the dog to be moved off of limit switch LS–2.

The conveyor drive mechanism operates on the circuit established by closing contacts LS–2–A until the next one of the dogs on the chain 25 strikes limit switch LS–2. This normalizes switch LS–2, opening its contacts LS–2–A to stop the conveyor drive mechanism 45 and allowing contacts LS–2–B thereof to close. Of course, relay CR–3 has opened prior to the completion of the operation of the conveyor drive mechanism 45. Current flows from the power line 42 through the contacts LS–2–B and through a normally closed pair of contacts CR–2–C of relay CR–2 to a door lowering mechanism 46 and through the contacts of a limit switch LS–3 to the power line 43. LS–3 is normal only when the furnace doors are closed and, therefore, though normally open, it is closed when the furnace doors are in any position other than closed. With the furnace doors open as described above, contacts LS–3–A are closed and current flows to the door lowering mechanism 46 until the door reaches closed position, actuating limit switch LS–3 and opening its contacts LS–3–A to stop the movement of the doors.

Safety controls are illustrated in the circuit of FIGURE 8 as comprising contacts LS–2–B of limit switch LS–2 which open as soon as the conveyor starts to move, preventing the energization of the door lowering mechanism 46 during movement of the conveyor and contacts CR–2–C of control relay CR–2 which are in series therewith. Contacts CR–2C are normally closed but, of course, are opened to prevent current reaching the door lowering mechanism 46 as soon as relay CR–2 is energized at the initiation of a cycle. It is thus impossible for the door lowering mechanism to be energized during the period of energization of the door raising mechanism or for the door lowering mechanism to be energized during the period of energization of the conveyor drive 45 and movement of the conveyor 25 and molds 10 from station-to-station.

FIGURE 9 of the drawings is a sectional view through a furnace of the type shown and described in the Harold A. McMaster, Norman C. Nitschke application Serial Number 62,463 filed October 13, 1960 showing a mold with a glass sheet thereon being bent to a predetermined position. The mold structure shown in FIG. 9 is generally similar to that shown in FIGURES 1 through 7 but differs principally therefrom in that the member 37 by which the profile or reference plane is established relative to the glass supporting surfaces of the mold is replaced by a mechanical structure. Those portions of FIGURE 9 which are similar to corresponding portions of the previously described embodiment are designated by a like reference numeral characterized further in that the letter "a" is added thereto.

Adjustable stops 50 comprise machine screws 51 that are threaded through bars 52 that are welded to the center of the inside rails 14a of the mold. Although in some instances only one stop need be provided, in the embodiment shown, two adjustable stops 50 are provided. A gauging device can be positioned against the machine screws 51 to establish a reference plane at a predetermined level relative to the glass supporting surfaces 14a of the mold. By adjusting the machine screws 51 relative to the top glass supporting surfaces of the rails 14a, the position of this reference plane can be adjusted. When the glass 26a sags to the reference plane, thus established, the particular mold 10a is moved out of the furnace.

The furnace shown in FIG. 9 has a roof 53 the floor 54, as well as upper and lower furnace doors 55 and 56 positioned at the end of the furnace adjacent one side of the glass bending station. The upper and lower furnace doors 55 and 56 are attached to opposite ends of a continuous chain 57, the center portion of which loops over a sprocket 58 that is rotatably supported by means of a pillow block 59 and support structure 60. The sprocket 58 is rotated by a suitable mechanism as described in the above-referred to McMaster and Nitschke application, which mechanism is caused to raise the doors when the solenoid 44 is actuated and is caused to lower the doors when the solenoid 46 is actuated. The same mechanism which operates the doors also controls the conveyor which moves the molds 10a so that the conveyor is only actuated when the doors are opened, and so that the conveyor is automatically stopped when the doors are closed.

As previously described, the lower ends of the machine screws 51 provide a stop at a fixed distance from the glass supporting surfaces of the inner rails 14a. The adjustable stops 50 are adjusted on each particular mold structure 10a so that the lower ends of the machine screws 51 are at the same distances below the glass supporting surfaces on all of the molds.

In the embodiment shown in FIGURE 9 a gauging device 61 is movably supported through the floor 54 of the furnace, so that it can be moved up into engagement with the adjustable stops 51 after a carriage 10a is brought into position in the bending zone by the conveyor structure. The gauging device 61 generally comprises a horizontal bar 62 the opposite ends of which are adapted to about the adjustable stops 51 on opposite sides of the mold 10a. The horizontal bar 62 is fixed to the upper end of a tubular member 63 which is adapted to be raised and lowered through the floor 54 of the furnace. The tubular member 63 is supported and guided for vertical movement through the floor of the furnace 54 by means of a sleeve 64. The tubular member 63 is raised and lowered by a hinged link 65 one end of which is connected to the tubular member 63 by a pin 66, and the other end of which is connected to a traveling bar 67 by a pin 68. One end of the traveling bar 67 is connected to the bottom of the lower door 56 by means of a tension spring 69, and the other end of the traveling bar 67 is pinned to a rigid support 70 beneath the floor of the furnace. The link 65 and traveling bar 67 are so proportioned that when the lower door 56 is in the upper closed position shown by solid lines in the drawing, the horizontal bar 62 will be in engagement with the adjustable stops 50. The purpose of the tension spring 69 is to permit a slight additional closing of the door 56 after the horizontal bar 62 abuts the adjustable stops to accommodate variations in the elevation of the molds 10a as well as various adjustments of the adjustable stops 50. Upon opening of the doors 55 and 56, the horizontal bar 62 is moved to the lower dotted position free and clear of the mold structures 10 so that molds can be moved into and out of the glass bending position above the gauging device 61.

In the embodiment shown in FIGURE 9, the gauging device 61 is provided with a contact finger 71 carried on the upper end of a pin 72 which extends upwardly through the center of the tubular member 63. The upper position of the finger 71 may be established in any suitable manner, and as shown in the drawing, is established by a bracket 73 welded to the lower end of the pin 72 in a position to abut the lower end of the tubular member 63. The pin 72 is biased into this position by means of a coil spring 74, the upper end of which is fixed to a bracket 75 that is welded to the tubular member 63. The coil spring 74 is a very light spring and allows the pin 72 to be moved when a very light force is applied to the finger 71. The finger 71, of course, projects upwardly from the top surface of the horizontal bar 62 by a fixed distance, and the top surface of the bar 62 is in turn located relative to the top or glass supporting surfaces of the inner rails 14a by the adjustable stops 50, so that the upper end of the finger 71 is supported at a precise predetermined location relative to the glass supporting surfaces when the engaging device 61 is in position against the mold 10a regardless of variations in the elevations of the molds above the floor 54.

The upper end of the finger 71 thus establishes a reference plane for the particular mold 10a at a predetermined level relative to its glass shaping surfaces 14a. A switch lever 76 contacts the lower end of the pin 72 so as to actuate switch 77 that is fastened to the lower end of the tubular member 63, when the glass 26a contacts the finger 71 and moves it downwardly by a very slight amount. The switch 77 performs a function similar to the photocell arrangement 36 of the previous embodiment to provide an input signal to an amplifier 41a having power supply lines 77 and 78 and an output line 79 which may be connected to the momentary relay CR-1 of the previously described embodiment. It will be seen that the adjustable stops 50 provide means on each mold positioning the gauging device 61 for establishing a fixed reference plane relative to the glass supporting surfaces of the mold by means of which sensing means located externally of the furnace can be used to determine when the glass has sagged to a predetermined position relative to the glass supporting surfaces of the mold.

The embodiment shown in FIGURE 10 is generally similar to that shown in FIGURE 9 but differs principally therefrom in that the gauging device 61 employs an electrical contact which is engaged by the glass itself and establishes an electrical circuit through the glass when the glass sags to its desired bent position. Those portions of the embodiment shown in FIGURE 10 which correspond to similar portions shown in FIGURE 9 are designated by like reference numerals characterized further in that the letter "b" is added thereto.

In the embodiment shown in FIGURE 10 the conveyor rollers 24b are grounded so that the mold structures and the glass resting thereon will be grounded when in the bending station of the furnace. The center pin 72b is electrically insulated from the tubular member 63b by insulation 80 which also firmly holds the center pin 72b rigidly with respect to the tubular member 63b. The bottom end of the pin 72b is electrically connected by a wire 81 to an amplifier 41b to supply an input signal thereto. The output of the amplifier is communicated by a wire 82 to a momentary relay CR-1 similar to that previously described for actuating the conveyor mechanism when the glass sags into contact with the finger 71b to complete an electrical input circuit to the amplifier 41b. Less pressure is required to be transferred by the glass onto the actuating finger 71b of the embodiment of FIGURE 10 than is required to be transferred to the finger 71 of FIGURE 9, so that less chance occurs of marring the glass.

The embodiment shown in FIGURE 11 is generally similar to the embodiment shown in FIGURE 9 but differs principally therefrom in that the gauging device utilizes an air jet to sense the sagged position of the glass. Those portions of the embodiment shown in FIGURE 11 which are similar to portions of FIGURES 9 and 10 previously described are designated by like reference numerals characterized further in that a letter "c" is added thereto.

The tubular member 63c has an air tube which extends upwardly through its center and which terminates in a nozzle or jet 83 at its upper end above the horizontal bar 62c. The tube 82 is supplied with low pressure air by a flexible tube 84 and pressure reducing valve 85. When the glass 26c sags to a position adjacent the upper end of the jet 83, it restricts the flow of air out of the jet 83, and produces a back pressure which is sensed through a line 86 and a diaphragm sensing device 87 similar to that used in conventional air gauging. The sensing device 87 operates a switch 88 which closes a contact in the input circuit of an amplifier 41c having an output lead 79c which in turn actuates a momentary relay CR–1.

The embodiment shown in FIGURE 12 is generally similar to the embodiments shown in FIGURES 9 through 11 but differs principally therefrom in that the means for sensing the position of the glass is a condenser plate which senses the amount of capacitance between the plate and the glass being bent. Those portions of the embodiment shown in FIGURE 12 which correspond to similar portions shown in the previously described embodiments are designated by a like reference numeral characterized further in that the letter "d" is added thereto. The finger 71d which acts as the condenser plate is affixed to the top end of the center pin 72d and is insulated from the tubular member 63d by insulation 80d. The bottom end of the pin 72d is connected by a wire 88 to a detector amplifier 41d having another wire 89 connected to the shaft of the conveyor roller 24d. When the capacitance of the capacitor formed by the glass 26d and the finger 71d reaches a predetermined value, the detector amplifier 41d supplies an output signal through the lead 79d to the momentary contact CR–1 to start the conveyor and move the mold from the furnace before any contact between the glass and finger 71d occurs.

The embodiment shown in FIGURE 13 employs the same furnace and mold structure as that used in the previous embodiments, and differs principally therefrom in that the sensing means which establishes a profile or reference plane to which the glass sags is completely mounted on and carried by each mold structure. Those portions of the embodiment shown in FIGURE 13 which correspond to similar portions of the embodiments previously described are designated by like reference numerals characterized further in that the letter "e" is added thereto. In the embodiment shown in FIGURE 13 a platinum wire 90 is strung across the mold between the side rails 14e at the desired profile or reference plane relative to the glass supporting surfaces. Opposite ends of the platinum wire are connected to porcelain insulators 91 one of which is mounted on an adjustable angle bracket 92 secured to one of the side rails 14e by a through bolt 93. The other porcelain insulator 91 is supported by a wire 94 which extends through an adjustable bracket 95 and passes over a pulley 96 to a weight 97. The weight 97 keeps the wire 90 taut, and by adjusting the brackets 92 and 95 on the side rails 14e, the reference plane to which the glass is allowed to sag can be adjusted relative to the glass supporting surfaces of the mold. The wire 90 is connected to an electrically conducting strip 98 fastened to and insulated from the outside of the mold support angle 23e. A contact blade 99 is supported from the sidewalls of the furnace in position to bear against the strip 98 so that it establishes a circuit with the wire 90 when the mold is in the glass bending position in the furnace. Contact blade 99 is connected to the electrical input signal wire as is the shaft of one of the conveyor rollers 24e to provide an electrical series circuit between the glass 26e and the wire 90. Electrical output wire 82e of the amplifier 41e is connected to momentary relay CR–1 which operates the conveyor and door mechanism previously described.

All of the various embodiments above described provide a reference plane or profile relative to the glass supporting surfaces of the mold which can be adjusted to be a fixed distance therefrom regardless of the elevation of the mold, and which can be used by various types of sensing means to perform some kind of control function of the glass being bent. Although the control function described above has been described as starting the conveyor to remove the mold carriage out of the furnace, other control functions also can be initiated or stopped, such as blowing cold air upon the glass on the mold to limit its sagging. While the invention has been described in considerable detail as being used to limit the degree of bend of glass in bending molds it is not intended to be limited thereto, and it will be apparent that it can be used in any type of operation wherein workpieces are carried by conveyor structures to locations where they are contoured to a predetermined shape.

What is claimed is:

1. In a sheet glass bending furnace having a final bending zone and a conveyor for sequentially moving a plurality of glass carrying and shaping molds, all of said molds having peripheral shaping surfaces and open centers into which the central portions of the respective glass sheets sag as their edges mold into contact with the shaping surfaces, the improvement comprising, in combination, a drive mechanism for said conveyor, vertically adjustable reference means mounted on each of said molds and positionable relative to the shaping surfaces of said mold for establishing a standard level spaced beneath said surfaces to which level the central portion of a glass sheet molded thereon is to be sagged, sensing means cooperating with said reference means for generating a signal when the central portion of a glass sheet sags to such standard level as established by said reference means, and means responsive to said signal for energizing said conveyor drive mechanism for moving each of said molds out of said final bending zone and the next one of said molds into said final bending zone.

2. Apparatus according to claim 1 in which the vertically adjustable reference means is an opaque member having a horizontal upper edge that is adjusted to the standard level for the particular mold and the sensing means consists of a horizontally aligned photocell and light beam generator on opposite sides of the furnace with the light beam having sufficient breadth to include the levels of all of the upper edges of all of the opaque members on all of the molds as they are moved into the final bending zone, whereby said opaque member interrupts the part of the light beam beneath the standard level for the respective mold and the central portion of the glass interrupts the part of the light beam above the standard level when it sags to the standard level.

3. Apparatus according to claim 1 in which the vertically adjustable reference means is at least one adjustable stop carried on the mold and having an engageable surface that is adjusted to the standard level for the particular mold and the sensing means consists of a probe, means for moving said probe upwardly into the open center space of a mold in the final bending zone and an engager which contacts said adjustable stop for limiting the upward movement of said probe at the standard level of said mold whereby when the central portion of the glass sheet sags to the standard level, the adjacency of the glass sheet and the probe generates a signal to the signal responsive means.

4. Apparatus according to claim 3 in which the probe is one element of an electrical circuit closer and closing the circuit generates the signal to the signal responsive means.

5. Apparatus according to claim 3 in which the probe is an upwardly directed air nozzle and the sensing means includes a pressure responsive element in the pneumatic system to said air nozzle which generates the signal to the signal responsive means when the central portion of the glass sags to the standard level and obstructs free flow of air from said nozzle.

6. Apparatus according to claim 1 in which the vertically adjustable reference means is an electrical conductor forming one side of an open electrical circuit to the signal responsive means and the sensing means includes means for connecting the glass sheet in the other side of the electrical circuit to the signal responsive means, whereby when the central portion of the glass sheet sags into adjacency with the reference means the electrical circuit is established as a signal to the signal responsive means.

References Cited by the Examiner

UNITED STATES PATENTS

| | | | |
|---|---|---|---|
| 1,227,027 | 5/1917 | Bailey et al. | 65 |
| 1,823,357 | 9/1931 | Frink | 65—163 X |
| 2,032,016 | 2/1936 | Hitner | 65—158 X |
| 2,060,634 | 11/1936 | Otis. | |
| 2,917,871 | 12/1959 | Atkeson | 65—161 |
| 2,954,644 | 10/1960 | Montgomery | 65—162 X |

FOREIGN PATENTS 1,193,723   11/1959   France.

DONALL H. SYLVESTER, *Primary Examiner.*

FRANK W. MIGA, *Examiner.*